United States Patent [19]

Keel et al.

[11] 4,090,881

[45] May 23, 1978

[54] HIGH TEMPERATURE REFRACTORY ADHESIVE

[75] Inventors: David LeRoy Keel, Augusta, Ga.; Richard Allen Waugh, Aiken, S.C.

[73] Assignee: The Babcock & Wilcox Company, New York, N.Y.

[21] Appl. No.: 701,256

[22] Filed: Jun. 30, 1976

[51] Int. Cl.² .............................................. C04B 35/14
[52] U.S. Cl. ......................................... 106/68; 106/69
[58] Field of Search ................................... 106/68, 69

[56] References Cited

U.S. PATENT DOCUMENTS

| | | | |
|---|---|---|---|
| 3,079,267 | 2/1963 | Konrad et al. | 106/69 |
| 3,231,401 | 1/1966 | Price et al. | 106/65 |
| 3,758,317 | 9/1973 | Moore et al. | 106/65 |
| 3,785,838 | 1/1974 | Weidman | 106/68 |

*Primary Examiner*—Patrick P. Garvin
*Assistant Examiner*—John P. Sheehan
*Attorney, Agent, or Firm*—Joseph M. Maguire; Vincent M. Fazzari; Angelo Notaro

[57] ABSTRACT

A high temperature non-conducting inorganic refractory adhesive suitable for use in conjunction with a number of substances including conducting elements metallic in nature.

4 Claims, 3 Drawing Figures

HIGH TEMPERATURE REFRACTORY ADHESIVE

BACKGROUND OF THE INVENTION

Recent years have witnessed an increasing growth in the use of ceramic fibers for numerous types of high temperature applications. However, most commercially available refractory adhesives generally have physical and chemical properties which make them unsuitable for use with ceramic fiber products. Often, such adhesives contain binders such as inorganic silicates which can attack the ceramic fibers and/or become electrically conductive at high temperatures. Such undesirable characteristics severely limit the areas of application of such adhesives leaving alternatives which are economically unattractive. In spite of such drawbacks, the tendency for favoring inorganic adhesives may be appreciated when one has used and encountered the problems inherent with employing many of the organic adhesives at high temperatures. Carbonization and volatilization are representative of the drawbacks of such compositions. What is needed is an inorganic adhesive which is not only useful at high temperatures, but displays numerous desirable properties so as to make it suitable for a broad spectrum of applications. Such a composition should not only retain its insulating value at high temperatures, but should also be able to retain sufficient rigidity to remain in place when subject to stresses and other forces at high temperatures. It should also be inert with respect to those items which its bonds, but should be able to move with them upon thermal cycling.

Representative of the prior art in this area is U.S. Pat. No. 3,231,401, entitled "Refractory Composition" by Price et al. This patent discloses a composition formed by ball milling ceramic fibers (preferably of the aluminum silicate variety) until the fibers have a length to diameter ratio of from about 10:1 to about 50:1. The shortened fibers are then mixed with an aqueous dispersion of colloidal inorganic oxide in an amount so as to provide an oxide content of from about 3 percent to about 40 percent by weight of the mixture on a dry basis. Careful control of the length to diameter ratio is credited with any number of the composition's properties.

U.S. Pat. No. 3,758,317, "Monolithic Inorganic Structures," by Moore et al discloses a homogeneous composition of negatively charged colloidal silica particles and positively charged colloidal particles which can be combined with particulate or fibrous refractory material. A "gel-like" structure is formed which upon drying experiences shrinkage.

SUMMARY OF THE INVENTION

The present invention is directed to a low-cost high temperature inorganic adhesive including mullite, alumina, ceramic fibers, colloidal silica and a binding agent blended within certain specified ratios to give desired characteristic properties to the mixture including non-conductibility, work-ability, ability to bond metallic elements to non-metallic elements at high temperatures, improved dried strength, and ability to be used in a broad spectrum of applications. Because of such properties, a long life composite of the type encountered, for example, in electrically heated support pads can now be produced, minimizing the deterioration encountered because of the undesirable drawbacks of the prior art adhesives.

The composition range on a dry weight basis of the present invention consists essentially of 33 to 80% mullite, 10 to 43% ceramic fiber, 5 to 20% colloidal silica, 5 to 20% alumina and 3 to 13% bentonite clay. Such a composition displays desirable electrical properties along with, among its other properties, suitable strength, shelf-life and viscosity.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
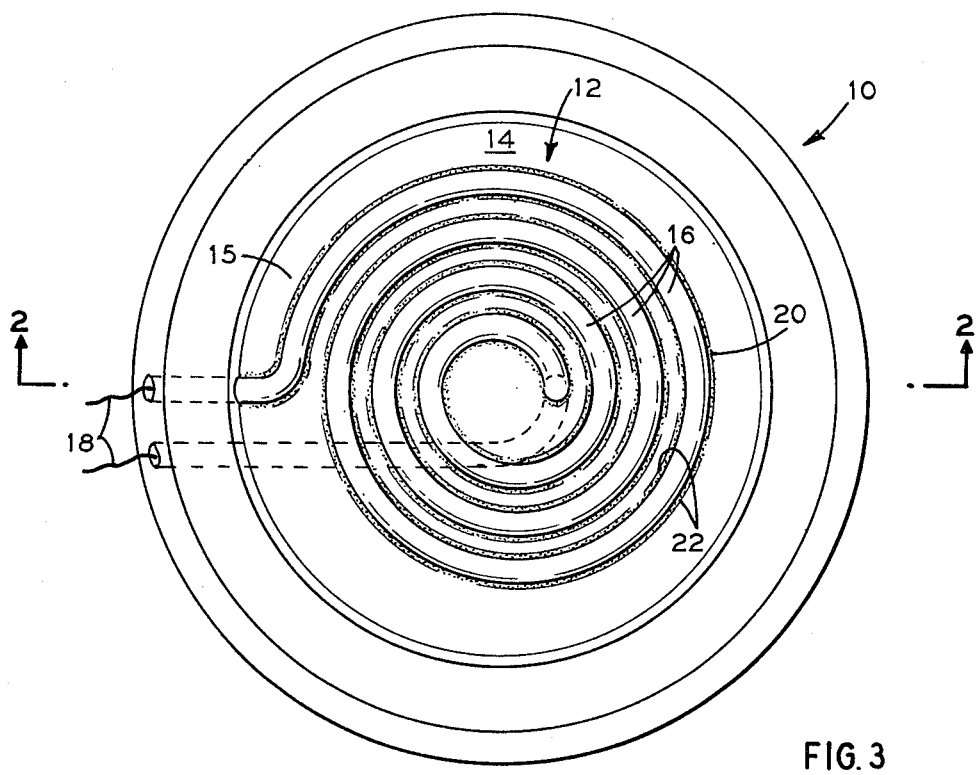
FIG. 1 generally depicts a supported assembled heating unit.
Figure 3:
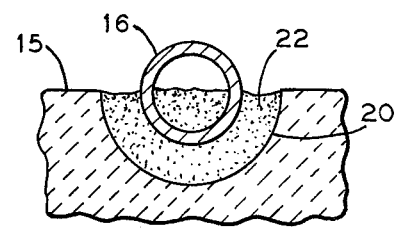
FIG. 3 is a view showing an enlargement of that portion of FIG. 2 wherein the invention composition is used.

The present invention is generally directed at a refractory composition but is more specifically directed at an inorganic adhesive composition which can be used for high temperature applications. This new inorganic adhesive may be described as consisting essentially of (on a dry weight basis) 33 to 80% mullite, 10 to 43% ceramic fibers, 5 to 20% colloidal silica, 5 to 20% alumina, and 3 to 13% bentonite clay.

Mullite is a crystalline compound of alumina and silica with the formula $3Al_2O_3.2SiO_2$ and has long been known for its usefulness in the production of high temperature refractories. Besides being of low cost, mullite has a melting point of approximately 3320° F and displays good thermal shock resistance.

Alumina has also been an important substance in the refractory trade. The ability to withstand very high temperatures without melting or softening, as well as chemical resistance to attack by basic materials, have made it an indispensable constituent in the solution to many refractory related problems.

It has been found that the ceramic fiber is a determinative factor in composing our refractory composition. While many commercially available ceramic fibers may be used in making the adhesive, varying results may be obtained. We preferably use ceramic fibers such as KAOWOOL (a registered trademark in the U.S. Patent and Trademark Office). It has been found that the temperature limitations as to the use of the adhesive varies with the temperature use limitations of the ceramic fibers. Additionally, SAFFIL (a registered trademark in the U.S. Patent & Trademark Office), a composition of polycrystalline alumina fibers, can also be used in formulating the refractory-adhesive composition. Of course, mixtures of the various ceramic fibers are also useful. The high temperature electrical insulating properties of our composition are believed to be attributed to the fact that constituents such as zirconia are absent and it is recommended that when using the present composition as a high temperature adhesive, such compounds containing zirconium in any form should be avoided. It is also believed that mixtures of alumina and chromium oxide or vanadium oxide should not be present.

The colloidal silica can be supplied to the mixture from a number of different sources, but a preferred form is as found in the composition known as LUDOX HS which is an aqueous colloidal sol containing about 30 percent by weight of the dispersion as silica. LUDOX HS, a registered trademark, is sold by E. I. duPont de Nemours and Company.

It has been found that bentonite clay is a preferred clay to be used in conjunction with the other constituents. Besides preventing settling of the fine particle-size ingredients, it imparts desirable viscosity to the composition to facilitate the application of the material when used as an adhesive. When the composition is used for other purposes, other clays may be used, however, the properties can be expected to show variations. It has also been found that when the bentonite clay is used in the recommended ranges, a satisfactory shelf life can be expected.

The present composition is a unique mixture of components which results in a composition displaying many beneficial properties. In particular, it has been found that this new composition is extremely well suited as an adhesive. An adhesive may generally be thought of as a substance used to bond, by surface attachment, two or more solids so that they act or can be used as a single piece. Our composition displays excellent refractory properties. While there are numerous available adhesives, it has been found that at higher temperatures, these adhesives become electrically conductive. In many applications, such conductivity results in adverse side effects which can seriously damage the product or significantly reduce the operational life due to weakening of the bond. In certain situations, a safety hazard develops since when the adhesive becomes conductive, there is a dangerous probability of a short circuit. The new composition is characterized by its ability to retain its insulating qualities even at those temperatures where other refractory adhesives become conducting. The composition also maintains its structural integrity and resists cracking and crumbling that could be occasioned by thermal stresses resulting from changes in temperature. The invention composition is compatible with a wide variety of materials giving it a broad spectrum of useful applications. While high relative humidity and prolonged temperature exposure showed a reduction in bond strength of a popular presently available commercial adhesive, our new composition actually showed little change in bond strength. Likewise, cycling from 2000° F down to 32° F did not adversely affect our bond strength but increased it while the commercially available adhesive showed a marked reduction in bond strength.

In addition to being inexpensive, our new composition is relatively simple to make. Preferably the raw materials, alumina, mullite and the ceramic fibers are milled to a particle size of less than 325 mesh, that is less than 44 microns. It has been found that the most stable and strongest cements result from such a milling step. Wet ball milling is appropriate and gives a smooth homogeneous product. Alternatively, the adhesive can be prepared by ball milling the dry ingredients and later adding the liquid colloidal silica binder and water in a blending operation, such as a Hobart mixer.

Within the compositional range of the components of the composition contemplated, a preferred range for each of the components has been identified. In this preferred range, on a dry weight basis, mullite will be present in an amount of 33-43%, ceramic fiber in an amount of 33-43%, alumina in an amount of 8-12%, colloidal silica in an amount of 8-12% and the clay in an amount of 3-5%.

Figure 2:
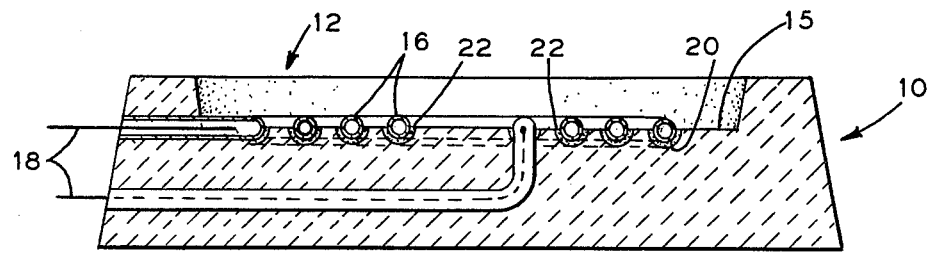
FIG. 2 is a view generally along 2—2 showing how the present invention may be applied in the heating unit of FIG. 1.

FIG. 1 generally shows an electrical element heating unit support assembly 10. The support assembly comprises a support casting 12 which is made of cast ceramic fiber. The casting 12 is fashioned with a cavity 14, the base 15 of which is formed with a continuous spiral groove 20 to accommodate electrical heating element 16. The heating element may be of iron, or Ni-Chrome or any other metallic type substance used for heating elements. Electrical connections 18 lead to the power source. FIG. 2 shows the spiral groove 20 which is formed in the base 15. The groove is semicircular in cross section and is of larger diameter than that portion of the element 16 which will fit into the groove. Shown as numeral 22 is the refractory composition previously described. As used, the composition is introduced into the oversized groove followed by insertion of the heating element 16 into the groove and composition. Of course, touch-up work follows. After sufficient air drying, the composition acts as an adhesive to bond the heating element 16 to the base 15 of the support assembly 10. In such an end use environment, the prolonged effect of temperature cycling is of concern as regards the strength of the adhesive bond formed. Summarized in the following table are the results compiled by an independent testing laboratory comparing the bond strength of our improved refractory adhesive with a successful commercially available adhesive. See following table.

| | TENSILE STRENGTH | |
|---|---|---|
| (Pounds to break bond, also shown as % of as-received strength) | | |
| Conditioning | Commercially Available | Improved Adhesive |
| As received | 3.5 (100%) | 4.4 (100%) |
| Effect of relative humidity (95-100% RH at 140° for 168 hrs.) | 1.8 (51%) | 4.3 (98%) |
| Effect of temperature (2000° F for 168 hrs.) | 3.4 (97%) | 6.4 (145%) |
| Effect of cycling (2000° F for 48 hrs.) (85-90% RH at 104° for 48 hrs.) (32° F for 8 hrs.) (85-90% RH at 104° F for 64 hrs.) | 2.5 (71%) | 7.8 (177%) |

Electrical life tests indicate that the improved adhesive displays electrical insulating properties commensurate with the objectives to be achieved. For testing, Kanthal D heating elements (1575 watts at 236 volts) were installed in the element support pads and the assemblies, covered with sheets of CER-VIT glass ceramic (Owens-Illinois), were energized at 240 volts. After 2000 hours (on time) cycle testing (60 minutes on, 15 minutes off) no sign of deterioration in the unit's performance was observed. Other unit testing consisting of 500 hours continuous on time followed by 3000 hours of cycling on time showed no deterioration of the adhesive or the unit.

As can be seen from the above data, whereas, other compositions showed substantial deterioration of bond strength when subject to various environmental changes, the composition of the present invention quite unexpectedly showed improved bond strengths. As is readily apparent, such properties suggest a wide use of applications of such a composition. Other uses for the adhesive are in attaching heating wires to glass ceramic surfaces, bonding layers of fiber insulation, bonding different vacuum-formed fiber shapes and basically just about any application requiring a refractory bond between materials. In application, the composition can be spread, brushed, sprayed, coated, trowelled or otherwise worked to provide the requisite uniformity and smoothness as the particular use may demand.

The embodiments of the invention in which an exclusive property or privilege is claimed are defined as follows:

1. A zirconium free inorganic refractory adhesive composition which on a dry weight basis consists of 33 to 80% mullite, 10 to 43% ceramic fiber, 5 to 20% alumina, 5 to 20% colloidal silica and 3 to 13% clay suspension agent, the composition upon setting being characterized by its high temperature electrical insulating properties and structural integrity with respect to thermal stresses.

2. An inorganic refractory adhesive as in claim 1 wherein the clay suspension agent is bentonite.

3. An inorganic refractory adhesive as in claim 1 which on a dry weight basis consists of 33–43% mullite, 33–43% ceramic fiber, 8–12% alumina, 8–12% colloidal silica and 3–5% clay suspension agent.

4. An inorganic refractory adhesive as in claim 3 wherein the clay suspension agent is bentonite.